US012770816B2

(12) United States Patent
Dai et al.

(10) Patent No.: US 12,770,816 B2
(45) Date of Patent: Oct. 20, 2026

(54) RELAY OF REDUCING ELECTODYNAMIC REPULSION FORCE

(71) Applicant: Xiamen Hongfa Electric Power Controls Co., Ltd., Xiamen (CN)

(72) Inventors: Wenguang Dai, Xiamen (CN); Liji Su, Xiamen (CN); Meng Wang, Xiamen (CN); Songsheng Chen, Xiamen (CN); Fengzhu Xie, Xiamen (CN)

(73) Assignee: XIAMEN HONGFA ELECTRIC POWER CONTROLS CO., LTD, Xiamen (CN)

( * ) Notice: Subject to any disclaimer, the term of this patent is extended or adjusted under 35 U.S.C. 154(b) by 243 days.

(21) Appl. No.: 18/608,050

(22) Filed: Mar. 18, 2024

(65) Prior Publication Data

US 2024/0312746 A1 Sep. 19, 2024

(30) Foreign Application Priority Data

Mar. 17, 2023 (CN) ........................ 202310262205.6

(51) Int. Cl.
*H01H 50/54* (2006.01)
*H01H 50/14* (2006.01)
*H01H 79/00* (2006.01)

(52) U.S. Cl.
CPC ............ *H01H 50/54* (2013.01); *H01H 50/14* (2013.01); *H01H 79/00* (2013.01)

(58) Field of Classification Search
None
See application file for complete search history.

(56) References Cited

U.S. PATENT DOCUMENTS 10,102,991 B2 * 10/2018 Kanematsu .............. H01H 9/34
2012/0175345 A1 * 7/2012 Tachikawa ............. H01H 9/443
218/26

(Continued)

FOREIGN PATENT DOCUMENTS

CN 207250372 U 4/2018
CN 109659197 A 4/2019

(Continued)

OTHER PUBLICATIONS

Korean Patent Office Action; KR 10-2024-0036632 mailed Mar. 24, 2025; 11 pages.

(Continued)

*Primary Examiner* — Bernard Rojas
(74) *Attorney, Agent, or Firm* — CANTOR COLBURN LLP

(57) ABSTRACT

A relay includes a contact assembly, the contact assembly includes a movable contact piece and a pair of stationary contact lead-out terminals, the movable contact piece is configured to contact with or separate from the pair of stationary contact lead-out terminals. At least one of the sides of the stationary contact lead-out terminals and the movable contact piece close to each other is provided with an inner contact portion, and the stationary contact lead-out terminals and the movable contact piece are abutted only by the inner contact portion, and the inner contact portion is disposed on a side where the pair of stationary contact lead-out terminals are close to each other.

18 Claims, 9 Drawing Sheets

(56) References Cited

U.S. PATENT DOCUMENTS

| | | | | |
|---|---|---|---|---|
| 2013/0127571 | A1* | 5/2013 | Takaya | H01H 33/60 335/201 |
| 2015/0194284 | A1* | 7/2015 | Uruma | H01H 50/546 335/179 |
| 2019/0013171 | A1* | 1/2019 | Minowa | H01H 50/44 |
| 2019/0326084 | A1 | 10/2019 | Lee et al. | |

FOREIGN PATENT DOCUMENTS

| | | | |
|---|---|---|---|
| CN | 110349811 | A | 10/2019 |
| CN | 111092002 | A | 5/2020 |
| CN | 111755286 | A | 10/2020 |
| CN | 113675042 | A | 11/2021 |
| CN | 216120118 | U | 3/2022 |
| EP | 2197009 | A1 | 6/2010 |
| JP | 2014063674 | A | 4/2014 |
| JP | 2020035561 | A | 3/2020 |
| JP | 2023509055 | A | 3/2023 |
| KR | 20200096195 | A | 8/2020 |
| WO | 2022179393 | A1 | 9/2022 |

OTHER PUBLICATIONS

Extended European Search Report for European Application No. EP24163860.0 dated Jul. 19, 2024, 11 pages.

* cited by examiner

C-C

RELAY OF REDUCING ELECTODYNAMIC REPULSION FORCE

CROSS REFERENCE

This application claims based upon claims priority to Chinese Patent Application No. 202310262205.6, titled "Relay", filed on Mar. 17, 2023, the entire contents thereof are incorporated herein by reference.

TECHNICAL FIELD

The present disclosure generally relates to the technical field of power appliances, in particular to a relay.

BACKGROUND

A relay is a kind of electronic control device, which is usually used in automatic control circuits. The relay includes a control system and a controlled system. The control system is also known as the input circuit, and the controlled system is also known as the output circuit. The relay is essentially an "automatic switch" that uses a small current to control a large current, so as to play the role of automatic adjustment, safety protection and circuit conversion in the circuit.

A high-voltage DC relay is a kind of relay, and most of the existing high-voltage DC relays adopt the movable contact piece direct-acting structure. With the increase of the cruising range of new energy vehicles, it is required that the heat loss of the high-voltage DC relay should be reduced under normal conditions, and because the battery capacity is higher when the battery pack is short-circuited, this requires further improvements in the anti-short circuit current capacity and the anti-short circuit current voltage capacity of the relay. When the short-circuit load is very large, the contacts of the high-voltage DC relay will bounce off due to the electrodynamic repulsion force generated by the short-circuit current, and then contact arcing will occur. Due to the high short-circuit current and voltage of the load, the contacts will suddenly ignite violently.

In order to solve this problem, the existing coil can only be made larger in size to improve the holding force of the movable iron core. However, under the framework requirements of small volume and low power consumption of users, the ampere-turn value of the coil cannot be improved, and only by increasing the contact pressure, the contact resistance of the contacts cannot be reduced and the large electrodynamic repulsion force cannot be resisted.

SUMMARY

According to one aspect of the present disclosure, a relay is provided, including: a contact assembly, including a movable contact piece and a pair of stationary contact lead-out terminals, the movable contact piece is configured to contact with or separate from the pair of stationary contact lead-out terminals; where, at least one of the sides of the stationary contact lead-out terminals and the movable contact piece close to each other is provided with an inner contact portion, and the stationary contact lead-out terminals and the movable contact piece are contacted only by the inner contact portion, and the inner contact portion is disposed on a side where the pair of stationary contact lead-out terminals are close to each other.

In some embodiments, an orthographic projection area of an end surface of a bottom portion of a stationary contact lead-out terminal facing the movable contact piece on the movable contact piece is less than or equal to an orthographic projection area of a middle portion of the stationary contact lead-out terminal on the movable contact piece.

In some embodiments, the inner contact portion is disposed between center lines of the pair of stationary contact lead-out terminals.

In some embodiments, an orthogonal projection area of the inner contact portion on the movable contact piece is smaller than an orthogonal projection area of a bottom portion of a stationary contact lead-out terminal on the movable contact piece.

In some embodiments, a recess is provided at a bottom of one end of a stationary contact lead-out terminal close to the movable contact piece, and the inner contact portion is a portion of the stationary contact lead-out terminal that is not provided with the recess and is located at the side where the pair of stationary contact lead-out terminals are close to each other.

In some embodiments, a shape of a cross section of the recess is any one of circle, ellipse, obround hole and polygon; or the recess is configured to be a through slot structure disposed on the stationary contact lead-out terminal and extending along a width direction of the movable contact piece.

In some embodiments, the inner contact portion is configured to be a boss protruding on one side of the movable contact piece close to the stationary contact lead-out terminals, and the boss is at least partially located at the side where the pair of stationary contact lead-out terminals are close to each other.

In some embodiments, a length of the movable contact piece is smaller than a distance between outer edges of corresponding recesses of the pair of stationary contact lead-out terminals.

In some embodiments, the movable contact piece including: a thrust portion, disposed between projections of the pair of stationary contact lead-out terminals on the movable contact piece; two extension portions, disposed at both sides of the thrust portion and configured to contact with the pair of stationary contact lead-out terminals correspondingly; where, a projected area of the inner contact portion relative to a reference plane is smaller than a projected area of an extension portion relative to the reference plane, and the reference plane is a plane where an upper surface of the thrust portion is located.

In some embodiments, the extension portion is configured to be a tapered structure, and a small end of the extension portion is disposed away from the thrust portion, so that the inner contact portion approaches to the side where the pair of stationary contact lead-out terminals are close to each other.

In some embodiments, at least one side of the extension portion facing the stationary contact lead-out terminals is configured to be an arc-shaped structure, and the inner contact portion is located at the side where the pair of stationary contact lead-out terminals are close to each other.

In some embodiments, in a width direction of the movable contact piece, two sides of the inner contact portion are arranged in parallel.

In some embodiments, in an axial direction of a stationary contact lead-out terminal, both sides of the thrust portion are configured to be a planar structure respectively.

In some embodiments, the relay further includes an anti-short circuit assembly, which is at least disposed at one side of the thrust portion close to the stationary contact lead-out terminals.

In some embodiments, the anti-short circuit assembly including: an upper magnetizer, disposed at one side of the thrust portion near the stationary contact lead-out terminals; a lower magnetizer, disposed at one side of the thrust portion far away from the stationary contact lead-out terminals; where, the upper magnetizer and the lower magnetizer are capable of forming a magnetic circuit therebetween to generate a suction force for resisting an electrodynamic repulsion force between the movable contact piece and the stationary contact lead-out terminals in case that a faulty high current is occurred in the movable contact piece.

In some embodiments, the thrust portion is provided with a through hole, and the lower magnetizer is configured to at least partially penetrate through the through hole.

In some embodiments, there are a plurality of upper magnetizers and a plurality of lower magnetizers, and the plurality of upper magnetizers and the plurality of lower magnetizers are disposed correspondingly, and side wall portions of two adjacent lower magnetizers which are close to each other are configured to pass through the through hole.

BRIEF DESCRIPTION OF THE DRAWINGS

For a better understanding of the present disclosure, reference may be made to the embodiments shown in the following drawings. Parts in the drawings are not necessarily to scale, and the related elements may be omitted in order to emphasize and clearly explain the technical features of the present disclosure. In addition, the related elements or parts may be arranged differently as known in the art. Besides, in the drawings, the same reference numerals indicate the same or similar parts in the various drawings. The above and other features and advantages of the present disclosure will become more apparent by describing in detail exemplary embodiments thereof with reference to the accompanying drawings.

DETAILED DESCRIPTION

Figure 1:
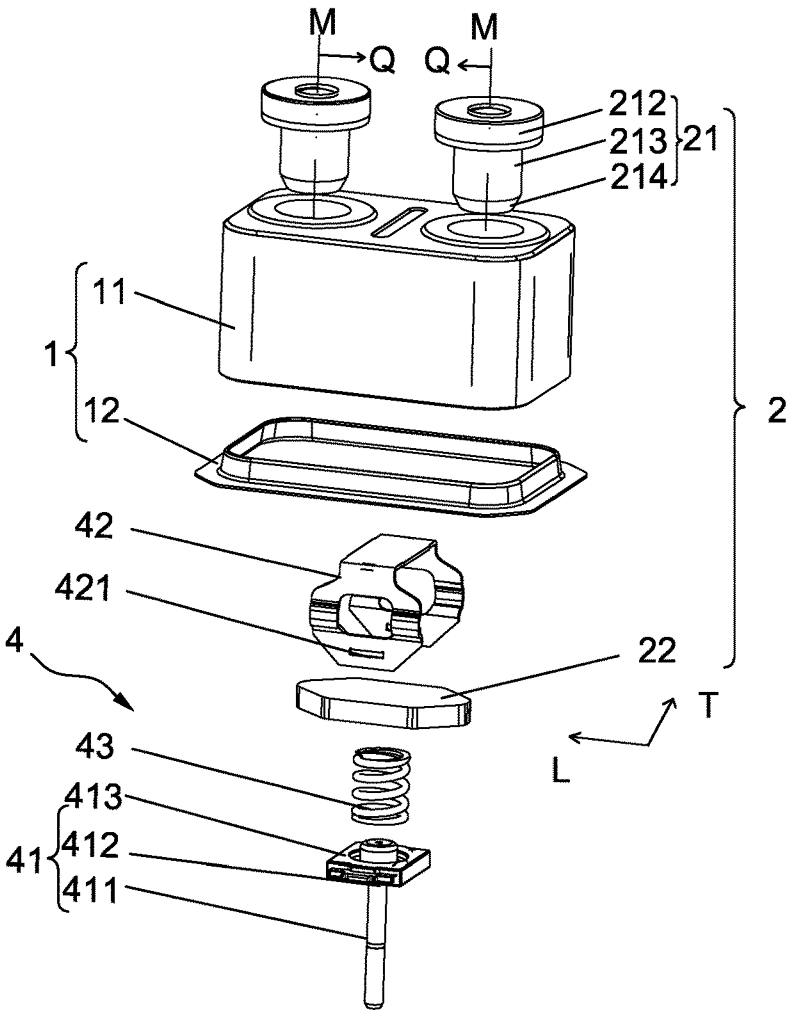
FIG. 1 is an explosion schematic diagram of a relay provided by the first embodiment of the present disclosure.

In the following, the technical solution in the exemplary embodiments of the present disclosure will be described clearly and completely with the attached drawings. The exemplary embodiments described herein are only for illustration purposes, and are not used to limit the scope of protection of this disclosure, so it should be understood that various modifications and changes can be made to the exemplary embodiments without departing from the scope of protection of this disclosure.

In the description of the present disclosure, unless otherwise specified and limited, the terms “first” and “second” are only used for descriptive purposes and cannot be understood as indicating or implying relative importance; the term “plurality” refers to two or more; the term “and/or” includes any and all combinations of one or more associated listed items. In particular, reference to “the/described” object or “an” object is also intended to indicate one of a possible plurality of such objects.

Unless otherwise specified or stated, the terms “connect” and “fix” shall be broadly understood. For example, “connect” can be fixed connection, detachable connection, integral connection, electrical connection or signal connection; “connect” can be direct connection or indirect connection through an intermediary. For those skilled in the art, the specific meanings of the above terms in the present disclosure can be understood according to specific situations.

Further, in the description of this disclosure, it should be understood that, the locative words such as “up/top”, “down/bottom”, “inside/inner” and “outside/outer” described in the exemplary embodiments of the present disclosure are described from the angle shown in the attached drawings, and should not be understood as limitations to the exemplary embodiments of the present disclosure. It should also be understood that, in this context, when it is mentioned that an element or feature is connected to the “upper”, “lower” or “inside” or “outside” of another element(s), it can not only be directly connected to the “upper”, “lower” or “inside” or “outside” of the other element(s), but also be indirectly connected to the "upper", "lower" or "inside" or "outside" of the other element(s) through an intermediate element.

Exemplary embodiments will now be described more fully with reference to the accompanying drawings. However, the exemplary embodiments can be implemented in various forms and should not be construed as limited to the embodiments set forth herein. Rather, these embodiments are provided so that this disclosure will be thorough and complete, and will fully convey the concepts of exemplary embodiments to those skilled in the art. The same reference numerals in the drawings indicate the same or similar structures, so their detailed description will be omitted.

First Embodiment

Figure 2:
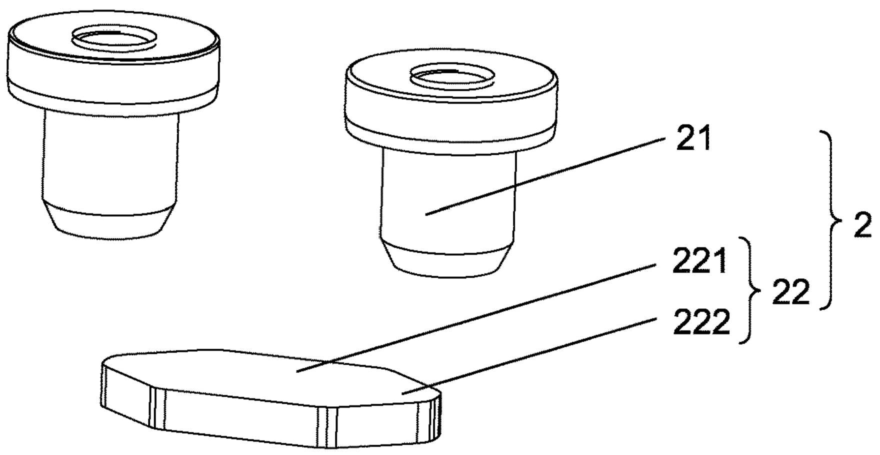
FIG. 2 is an explosion schematic diagram of a contact assembly of the relay provided by the first embodiment of the present disclosure.

The embodiment of the present disclosure provides a relay, in particular to a high-voltage DC relay. As shown in FIG. 1 to FIG. 2, the relay includes a contact container 1 and a contact assembly 2. The contact assembly 2 includes a movable contact piece 22 and a pair of stationary contact lead-out terminals 21. The stationary contact lead-out terminals 21 are provided on the contact container 1 and at least partially extend into the contact container 1. The movable contact piece 22 is provided in the contact container 1, and the movable contact piece 22 is used to contact with or separate from the pair of stationary contact lead-out terminals 21.

In the relay of the embodiment of the present disclosure, the stationary contact lead-out terminals 21 are provided on the contact container 1 and at least partially extend into the contact container 1, thus, while the contact container 1 provides fixed positions for the stationary contact lead-out terminals 21, the contact container 1 also provides an insulating environment for the movable contact piece 22 and at least part of the stationary contact lead-out terminals 21 of the contact assembly 2. The movable contact piece 22 is used to contact with or separate from the pair of stationary contact lead-out terminals 21. When the movable contact piece 22 contacts with the stationary contacts at the bottom of the pair of the stationary contact lead-out terminals 21, the current flows in from one stationary contact lead-out terminal 21, and flows out from the other stationary contact lead-out terminal 21 after passing through the movable contact piece 22, thus realizing the connection of the load.

When the short-circuit load is large, under the action of short-circuit current, an electrodynamic repulsion force will be generated between the movable contact piece 22 and the stationary contact lead-out terminal 21 which will cause the contacts to bounce off, resulting in the contact pulling an arc and burning violently, and even an explosion may occur.

Figure 3:
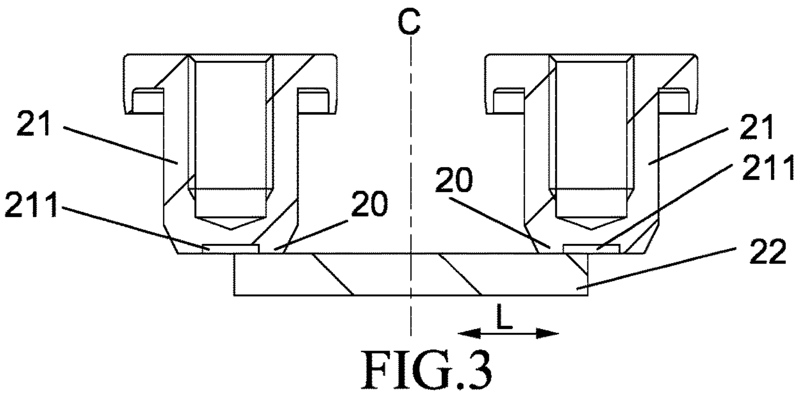
FIG. 3 is a cross-sectional view of the contact assembly of the relay provided by the first embodiment of the present disclosure.

As shown in FIG. 3, at least one of the sides of the stationary contact lead-out terminal 21 and the movable contact piece 22 of the embodiment close to each other is provided with an inner contact portion 20, and the stationary contact lead-out terminal 21 and the movable contact piece 22 are contacted only by the inner contact portion 20, and the inner contact portion 20 is arranged on the side where the pair of stationary contact lead-out terminals 21 are close to each other.

In the relay provided by this embodiment, the stationary contact lead-out terminals 21 and the movable contact piece 22 are contacted with each other through the inner contact portions 20, so that a current path is formed between the stationary contact lead-out terminals 21 and the movable contact piece 22. The inner contact portion 20 is disposed on the side where the pair of stationary contact lead-out terminals 21 are close to each other, so that the contact positions between the stationary contact lead-out terminals 21 and the movable contact piece 22 are close to the center line C of the movable contact piece 22 along the length direction L of the movable contact piece 22. According to the current path between the stationary contact lead-out terminals 21 and the movable contact piece 22, the contact positions are as close as possible to the center line area of the movable contact piece 22 and concentrated at the insides of the stationary contact lead-out terminals 21, thereby, the electrodynamic repulsion force is reduced to reduce the risk of arcing caused by mutual bounce between the stationary contact lead-out terminals 21 and the movable contact piece 22, and the safety is improved. At the same time, the relay can reduce the electrodynamic repulsion force without increasing the volume and size, and meet the requirements of lightweight.

It should be specially explained that the inside specifically refers to the side where the pair of stationary contact lead-out terminals 21 are close to each other (Q is the direction where the pair of stationary contact lead-out terminals 21 are close to each other as shown in FIG. 1) or the side near the center line C of the movable contact piece 22 in the length direction L (L represents the length direction of the movable contact piece 22 and T represents the width direction of the movable contact piece 22 as shown in FIG. 1). Therefore, the inner contact portion 20 is disposed at the inner side of the center line M of the stationary contact lead-out terminal 21, or between the center lines M of the two stationary contact lead-out terminals 21 (as shown in FIG. 1, M represents the center line of the stationary contact lead-out terminal 21).

In particular, if the contact position between the stationary contact lead-out terminal 21 and the movable contact piece 22 is near the center line M of the stationary contact lead-out terminal 21, since the portion of the stationary contact lead-out terminal 21 beyond the movable contact piece 22 cannot generate a circuit with the movable contact piece 22, the electrodynamic repulsion force is only generated between the corresponding portions of the stationary contact lead-out terminals 21 and the movable contact piece 22, the angle between the direction of current flow from the stationary contact lead-out terminal 21 to the contact position and the horizontal plane is relatively gentle, so the direction of the current is closer to being parallel to the horizontal plane, and the component of the current in the horizontal plane is relatively large, so that the electrodynamic repulsion force between the stationary contact lead-out terminals 21 and the movable contact piece 22 is relatively large.

Figure 4:
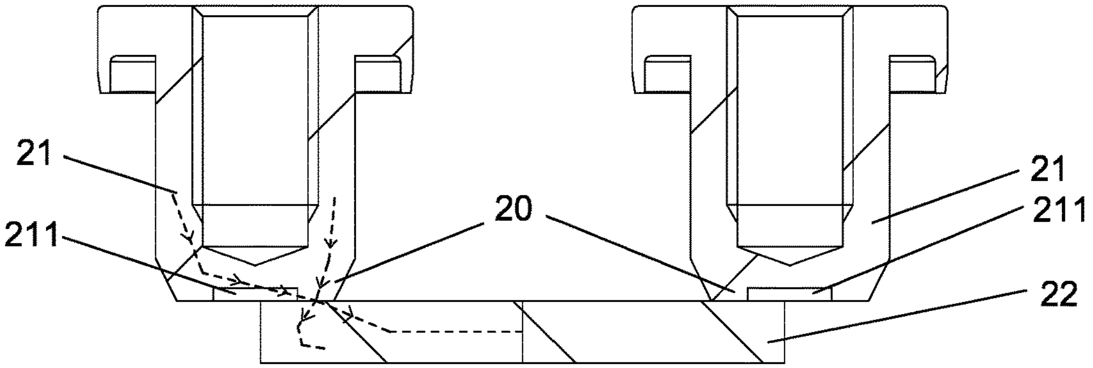
FIG. 4 is a schematic diagram of the current produced when the contact assembly of the relay are contacted according to the first embodiment of the present disclosure.

However, as shown in FIG. 4, the contact positions between the stationary contact lead-out terminals 21 and the movable contact piece 22 provided by the embodiment is far from the center lines M of the stationary contact lead-out terminals 21 and close to the sides where the pair of stationary contact lead-out terminals 21 are close to each other, in this way, the direction of the current from the stationary contact lead-out terminal 21 to the inner contact portion 20 is steeper, that is, the angle between the direction of the current from the stationary contact lead-out terminal 21 to the inner contact portion 20 and the horizontal plane is relatively large, so that the component of the current in the horizontal plane is relatively small, thereby reducing the electrodynamic repulsion force between the stationary contact lead-out terminals 21 and the movable contact piece 22.

In one embodiment, as shown in FIG. 3, the edge of the top end of the inner contact portion 20 at the side where the pair of stationary contact lead-out terminals 21 are close to each other is flush with the edge of the stationary contact lead-out terminal 21, that is, the side wall of the inner contact portion 20 is connected with and extends from the side wall of the corresponding stationary contact lead-out terminal 21.

In this way, the contact positions between the stationary contact lead-out terminals 21 and the movable contact piece 22 are closer to the sides where the stationary contact lead-out terminal 21 are close to each other, that is, the inner contact portion 20 is located at the inner position of the stationary contact lead-out terminal 21, so as to achieve the purpose of reducing the electrodynamic repulsion force.

Figure 5:
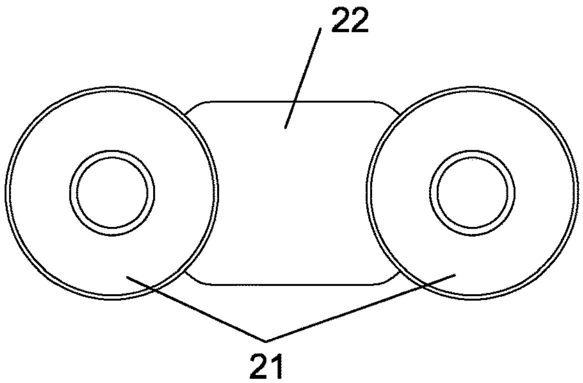
FIG. 5 is a first schematic structural diagram of the contact assembly of the relay provided by the first embodiment of the present disclosure.
Figure 6:
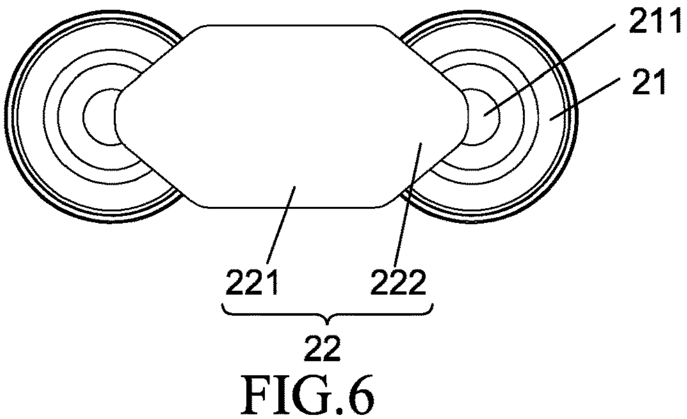
FIG. 6 is a second schematic structural diagram of the contact assembly of the relay provided by the first embodiment of the present disclosure.
Figure 7:
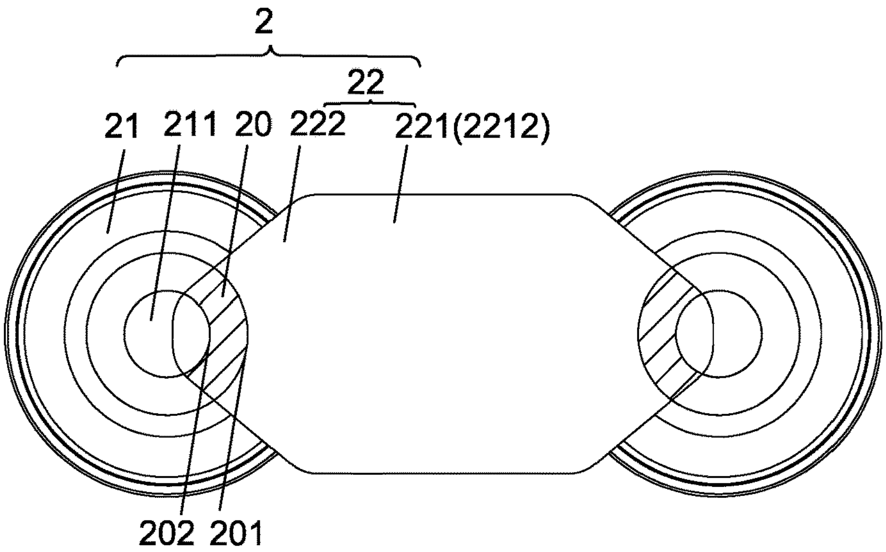
FIG. 7 is a schematic diagram showing the relative positions of the contact assembly and the inner contact portions of the relay provided by the first embodiment of the present disclosure.

In one embodiment, as shown in FIG. 5 to FIG. 7, a recess 211 is formed at the bottom of one end of the stationary contact lead-out terminal 21 close to the movable contact piece 22, and the inner contact portion 20 is the portion of the stationary contact lead-out terminal 21 that is not provided with the recess 211 and is located at one side of the pair of stationary contact lead-out terminals 21 close to each other.

The recess 211 is provided at the bottom of the end of the stationary contact lead-out terminal 21 close to the movable contact piece 22, that is, the portion of the bottom of the stationary contact lead-out terminal 21 that is not provided with the recess 211 is a convex structure. The inner contact portion 20 is disposed at the side where the pair of the stationary contact lead-out terminals 21 are close to each other, the convex structure is not entirely formed as the inner contact portion 20, but the portion of the convex structure close to the side where the pair of the stationary contact lead-out terminals 21 are close to each other is the inner contact portion 20.

In this way, the bottom of one end of the stationary contact lead-out terminal 21 near the movable contact piece 22 is in contact with the movable contact piece 22 at the edge near the center line of the movable contact piece 22 in the length direction L, by providing the recess 211 on the stationary contact lead-out terminal 21, the recess 211 can give way to the local area of the contact position of the movable contact piece 22. Since the stationary contact lead-out terminals 21 are fixed on the contact container 1, the positions of the stationary contact lead-out terminals 21 are relatively fixed. Even if the dispersion difference of the length dimension of the movable contact piece 22 exceeds the center distance, or the movable contact piece 22 has a certain positional deviation in its length direction L, since the recess 211 of the stationary contact lead-out terminal 21 can give way to the movable contact piece 22, the portion of the movable contact piece 22 under the recess 211 cannot contact with the stationary contact lead-out terminal 21, so that the contact area between the stationary contact lead-out terminal 21 and the movable contact piece 22 can be accurately controlled, so that the contact area is relatively fixed and the consistency of the relay can be ensured. At the same time, the inner contact portion 20, as the portion of the stationary contact lead-out terminal 21, contacts with the movable contact piece 22, so that the contact area is close to the inside position, thereby reducing the electrodynamic repulsion force between the movable contact piece 22 and the stationary contact lead-out terminals 21.

Figure 8:
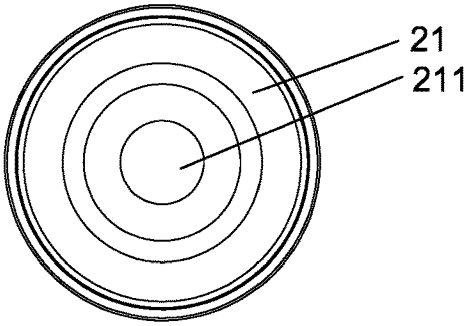
FIG. 8 is a first schematic structural diagram of a recess of the relay provided by the first embodiment of the present disclosure.
Figure 9:
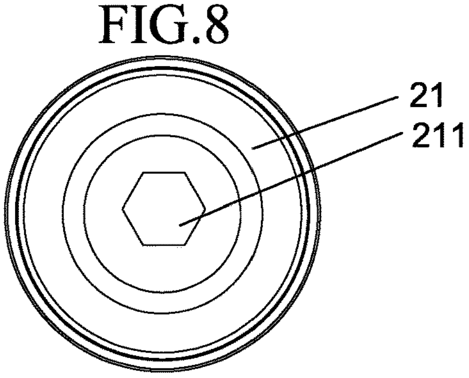
FIG. 9 is a second schematic structural diagram of a recess of the relay provided by the first embodiment of the present disclosure.
Figure 10:
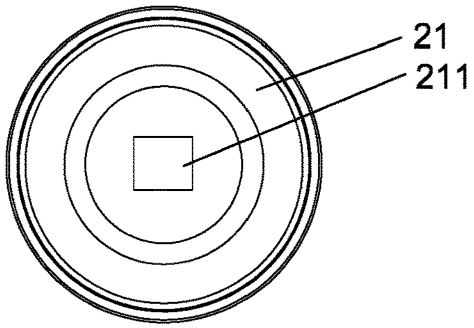
FIG. 10 is a third schematic structural diagram of a recess of the relay provided by the first embodiment of the present disclosure.

In one embodiment, as shown in FIG. 8 to FIG. 10, the shape of the cross section of the recess 211 is any one of circle, ellipse, obround hole and polygon, the shape of the cross section can be understood as the shape of the periphery of the recess 211. Alternatively, the recess 211 is a through slot structure disposed on the stationary contact lead-out terminal 21 and extending along the width direction T of the movable contact piece 22.

For example, when the shape of the cross section of the recess 211 is circular, the recess 211 is a circular recess, then the convex structure of the stationary contact lead-out terminal 21 is a circular ring structure, and the inner contact portion 20 is a portion of the circular ring structure close to the inside position.

It can be understood that the shape of the cross section of the recess 211 is not limited in the embodiment, and it can be deformed and expanded based on a circle to form an ellipse, an obround hole, a polygon, etc., among them, the obround hole can also be called kidney hole or runway hole. Where, the polygon includes but is not limited to triangle, rectangle, pentagon and hexagon, etc.

Of course, in some other embodiments, the cross section of the recess 211 can also have other irregular shapes, such as a partial shape of the above shape, specifically, semi-circular, semi-elliptical, semi-obround and half shape of the above polygon. Alternatively, a through slot is directly formed at the bottom of the stationary contact lead-out terminal 21, and the through slot extends along the width direction T of the movable contact piece 22, and the extending direction of the through slot is perpendicular to the connecting line of the center points at the bottom of the pair of stationary contact lead-out terminals 21. In the embodiment, the shape of the recess 211 is not limited, as long as the inner contact portion 20 is ensured to be located on the inside of the stationary contact lead-out terminal 21.

In one embodiment, as shown in FIG. 4, the length of the movable contact piece 22 is smaller than the distance between the outer edges of the recesses 211 of the pair of stationary contact lead-out terminals 21. That is, the length of the movable contact piece 22 is smaller than the distance between the edges of the recesses 211 of the pair of stationary contact lead-out terminals 21 on the sides far away from each other.

If the length of the movable contact piece 22 is greater than or equal to the distance between the outer edges of the recesses 211 of the pair of stationary contact lead-out terminals 21, the contact positions between them can also cover the sides of the stationary contact lead-out terminals 21 that are far away from each other, that is, the outer sides of the stationary contact lead-out terminals 21, resulting in a relatively large electrodynamic repulsion force generated between the stationary contact lead-out terminals 21 and the movable contact piece 22. Therefore, the length of the movable contact piece 22 is less than the distance between the outer edges of the recesses 211 of the pair of stationary contact lead-out terminals 21, which is equivalent to reducing the length of the movable contact piece 22 and making the contact positions between the stationary contact lead-out terminals 21 and the movable contact piece 22 are close to the sides where the stationary contact lead-out terminals 21 are close to each other. That is, the inner contact portion 20 is located at the inner position of the stationary contact lead-out terminal 21, or the inner contact portion 20 is close to the center line of the movable contact piece 22 in the length direction L, so as to achieve the purpose of reducing the electrodynamic repulsion force.

In one embodiment, the orthogonal projection area of the inner contact portion 20 on the movable contact piece 22 is smaller than the orthogonal projection area of the bottom portion of the stationary contact lead-out terminal 21 on the movable contact piece 22.

In case that the recess 211 is not provided at the bottom of the stationary contact lead-out terminal 21, and the length of the movable contact piece 22 is reduced so that the length of the movable contact piece 22 is shorter than the distance between the center lines M of the two stationary contact lead-out terminals 21, then the orthogonal projection area of the inner contact portion 20 on the movable contact piece 22 is equal to that of the stationary contact lead-out terminal 21 on the movable contact piece 22, that is, the portion of the stationary contact lead-out terminal 21 corresponding to the contact position between the movable contact piece 22 and the stationary contact lead-out terminal 21 is the inner contact portion 20. However, the orthogonal projection area of the inner contact portion 20 on the movable contact piece 22 of the embodiment is smaller than that of the bottom of the stationary contact lead-out terminal 21 on the movable contact piece 22, the inner contact portion 20 cannot be obtained only by shortening the length of the movable contact piece 22, but a recess 211 is formed at the bottom of the end of the stationary contact lead-out terminal 21 close to the movable contact piece 22, and the inside portion of the stationary contact lead-out terminal 21 without the recess 211 forms the inner contact portion 20. Therefore, the embodiment can effectively reduce the contact area between the stationary contact lead-out terminal 21 and the movable contact piece 22, and can ensure that the contact position between the stationary contact lead-out terminal 21 and the movable contact piece 22 is close to the inside.

In one embodiment, as shown in FIG. 7, at least one side of the inner contact portion 20 in the longitudinal direction L of the movable contact piece 22 has an arc structure.

When the recess 211 is a through slot or its shape is rectangular or hexagonal, the inner edge of the inner contact portion 20 can be the inner edge of the stationary contact lead-out terminal 21, that is, the inner side of the inner contact portion 20 has an arc structure, and one side of the inner contact portion 20 has the arc structure.

As shown in FIG. 7, when the recess 211 is in a shape of circle, ellipse or obround hole, etc., the inner edge 201 of the inner contact portion 20 can be the inner edge of the stationary contact lead-out terminal 21, and the outer edge 202 of the inner contact portion 20 can be the edge of the wall of the recess 211, both the inner edge 201 and the outer edge 202 of the inner contact portion 20 have arc structures, and both sides of the inner contact portion 20 have arc structures.

In one embodiment, as shown in FIG. 1, the stationary contact lead-out terminal 21 has a top portion 212, a middle portion 213 and a bottom portion 214 in the extending direction of its center line M. The orthographic projection area of the end surface of the bottom portion 214 facing the movable contact piece 22 on the movable contact piece 22 is less than or equal to the orthographic projection area of the middle portion 213 of the stationary contact lead-out terminal 21 on the movable contact piece 22.

In other words, the projection of the inner contact portion 20 on the movable contact piece 22 is located in the projection of the middle portion 213 of the stationary contact lead-out terminal 21 on the movable contact piece 22, the projection range of the inner contact portion 20 on the movable contact piece 22 cannot exceed the projection range of the middle portion 213 of the stationary contact lead-out terminal 21 on the movable contact piece 22, so that the direction of the current from the stationary contact lead-out terminal 21 to the inner contact portion 20 can be steeper, thereby reducing the electrodynamic repulsion force.

In one embodiment, as shown in FIG. 7, the movable contact piece 22 includes a thrust portion 221 and two extension portions 222, where, the thrust portion 221 is disposed between the pair of stationary contact lead-out terminals 21, and the two extension portions 222 are disposed at both sides of the thrust portion 221 and contact with the pair of stationary contact lead-out terminals 21 correspondingly.

After a thrust is applied to the thrust portion 221, the extension portions 222 are driven by the thrust portion 221 to move in the direction close to the stationary contact lead-out terminals 21, so that the two extension portions 222 contact with the pair of stationary contact lead-out terminals 21. The thrust portion 221 plays the role of bearing the thrust, and the extension portions 222 provide mutual contact areas for the movable contact piece 22 and the stationary contact lead-out terminals 21, so that the two spaced stationary contact lead-out terminals 21 are butted with their corresponding extension portions 222.

In one embodiment, both sides of the thrust portion 221 have a planar structure in the axial direction of the stationary contact lead-out terminal 21. Where, the axial direction of the stationary contact lead-out terminal 21 is the extension direction of the center line M of the stationary contact lead-out terminal 21.

In this way, the lower side of the thrust portion 221 is a plane structure, which can increase the stress area and ensure the stress stability. The upper side of the thrust portion 221 has a planar structure, so as to provide installation positions for other components.

In one embodiment, as shown in FIG. 7, the projected area of the inner contact portion 20 relative to the reference plane 2212 is smaller than that of the extension portion 222 relative to the reference plane 2212, where, the reference plane 2212 is a plane where the upper surface of the thrust portion 221 is located.

The extension portion 222 provides a mutual contact area for the movable contact piece 22 and the stationary contact lead-out terminal 21, if the projected area of the inner contact portion 20 with respect to the reference plane is equal to the projected area of the extension portion 222 with respect to the reference plane, then the whole extension portion 222 is configured to be the contact area between the movable contact piece 22 and the stationary contact lead-out terminal 21, resulting in a relatively large contact area. However, in the embodiment of the present disclosure, the projected area of the inner contact portion 20 relative to the reference plane is smaller than the projected area of the extension portion 222 relative to the reference plane, because the inner contact portion 20 is the actual contact area between the movable contact piece 22 and the stationary contact lead-out terminal 21, the contact area is closer to the inside to achieve the purpose of reducing the electrodynamic repulsion force.

In one embodiment, as shown in FIG. 7, the extension portion 222 is configured to be a tapered structure, and the small end of the extension portion 222 is disposed away from the thrust portion 221, so that the area of the inner contact portion 20 is reduced and the inner contact portions 20 approach to the sides where the pair of stationary contact lead-out terminals 21 are close to each other.

By arranging the extension portion 222 in a tapered structure, the movable contact piece 22 has a sharp corner structure at both ends. The small end of the extension portion 222 is arranged away from the thrust portion 221, compared with the rectangular structure (that is, when the extension portion 222 is not a tapered structure, but a rectangular structure), which is equivalent to cutting four top corners on the basis of the rectangular structure to form a sharp corner structure at both ends, the sharp corner structure at both ends plays a role of avoidance. While reducing the contact area between the movable contact piece 22 and the stationary contact lead-out terminals 21, the inner contact portions 20 also approach the sides where the pair of stationary contact lead-out terminals 21 are close to each other to some extent, so the inner contact portion 20 can be closer to the center line of the movable contact piece 22 in the length direction L, so as to achieve the purpose of reducing the electrodynamic repulsion force.

It can be understood that in the width direction T of the movable contact piece 22, the included angle between the two sides of the inner contact portion 20 is acute, right or obtuse, and as shown in FIG. 7, the central angle corresponding to the arc-shaped inner edge 201 of the inner contact portion 20 is the above included angle.

Figure 18:
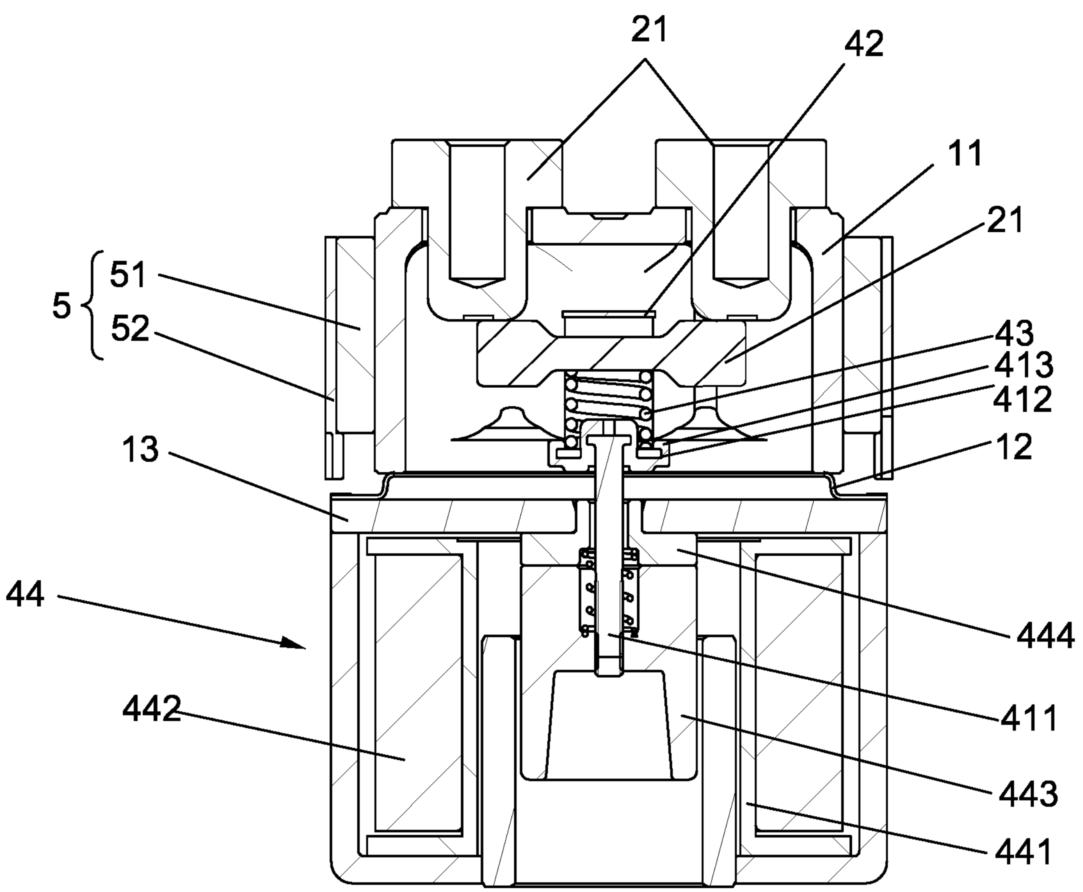
FIG. 18 is a cross-sectional view at C-C in FIG. 17.

In one embodiment, the contact container 1 includes an insulating cover 11, which is connected with the yoke plate 13 (as shown in FIG. 18) through a frame piece 12. The insulating cover 11 and the yoke plate 13 enclose a contact chamber, and the contact chamber provides an insulating environment for the contact between the movable contact piece 22 and the stationary contact lead-out terminals 21.

Figure 11:
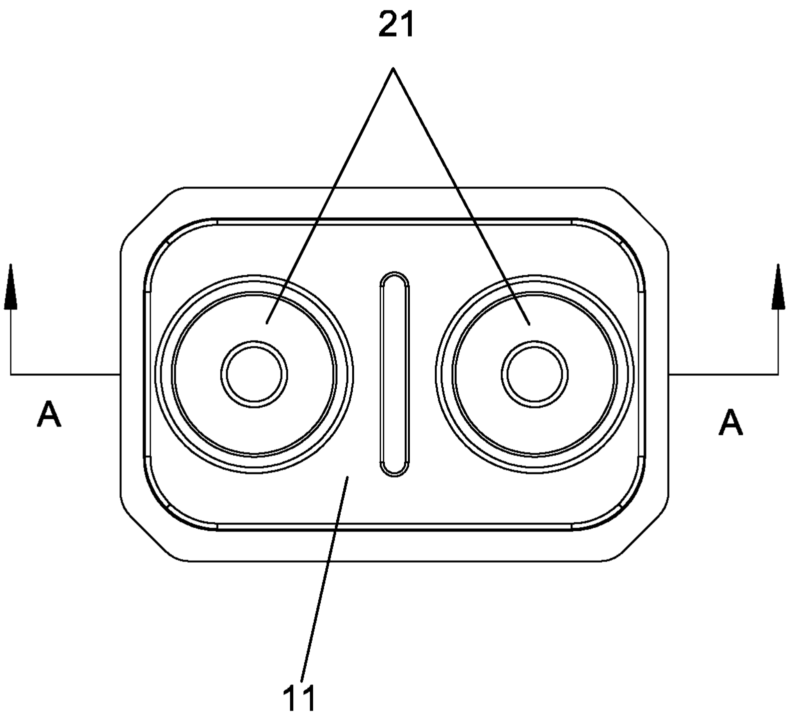
FIG. 11 is a top view of the relay provided by the first embodiment of the present disclosure.
Figure 12:
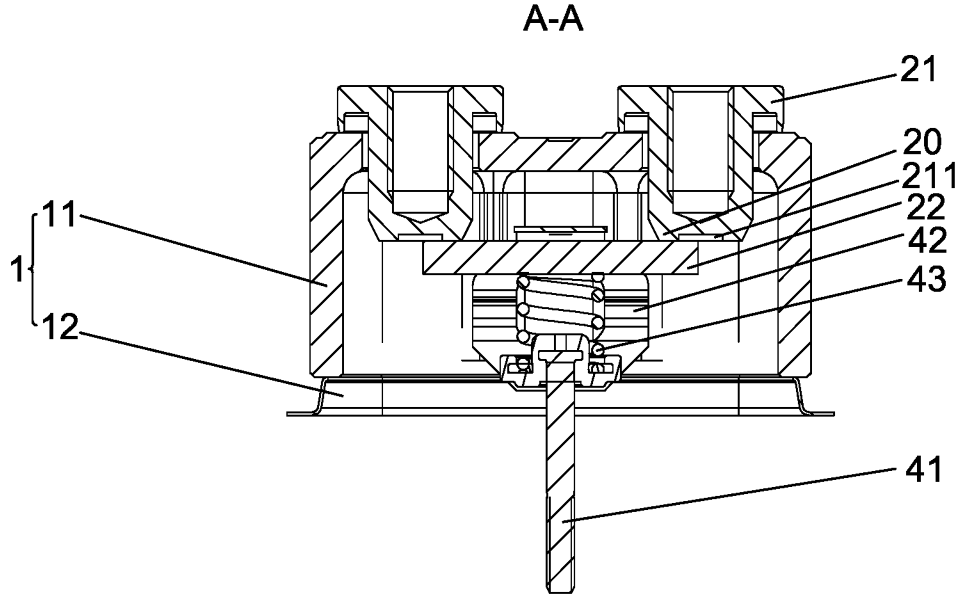
FIG. 12 is a cross-sectional view at A-A in FIG. 11.

In one embodiment, as shown in FIG. 1 and FIG. 11 to FIG. 12, the relay further includes a pushing assembly 4, which includes a pushing rod 411, a base 413, a fixing piece, an elastic member 43 and a U-shaped bracket 42. The base 413, the fixing piece and the upper portion of the pushing rod 411 can be integrally injection molded to form the pushing rod unit 41, and the bottom of the U-shaped bracket 42 is fixedly connected with the fixing piece, the U-shaped bracket 42 and the base 413 enclose a frame structure. The movable contact piece 22 and the elastic member 43 are installed in the frame structure surrounded by the U-shaped bracket 42 and the base 413. One end of the elastic member 43 abuts against the base 413, and the other end abuts against the movable contact piece 22. The elastic member 43 can provide elastic force, so that the movable contact piece 22 tends to be far away from the base 413 and close to the stationary contact lead-out terminals 21.

The working process of the relay provided by the embodiment is as follows.

Since one end of the elastic member 43 abuts against the base 413 and the other end abuts against the movable contact piece 22, the elastic member 43 can provide elastic force under the push of the pushing rod unit 41, so that the movable contact piece 22 tends to be far away from the base 413 and close to the stationary contact lead-out terminals 21. When the pushing rod unit 41 is moved to a proper position, the movable contacts at both ends of the movable contact piece 22 contact with the two stationary contact lead-out terminals 21, respectively.

Second Embodiment

This embodiment is similar to the first embodiment, and the only difference is the specific structure of the movable contact piece 22.

Figure 13:
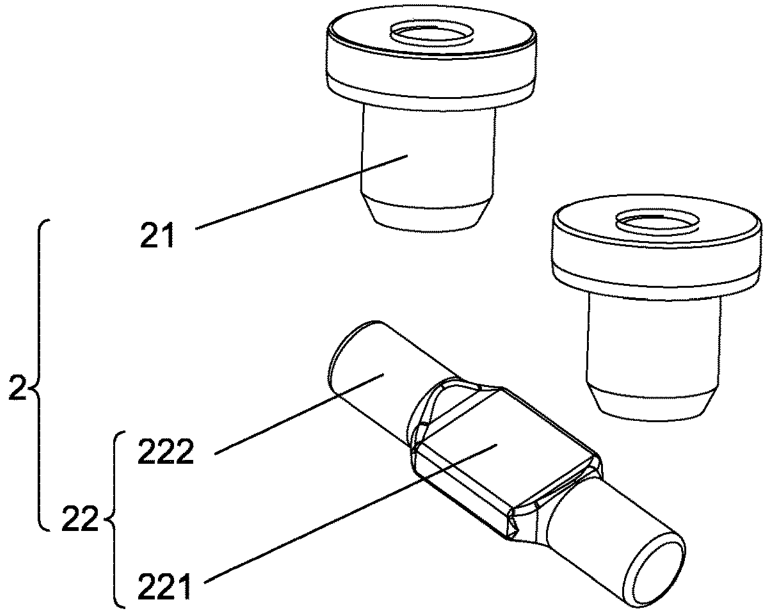
FIG. 13 is an explosion schematic diagram of a contact assembly of the relay provided by the second embodiment of the present disclosure.
Figure 14:
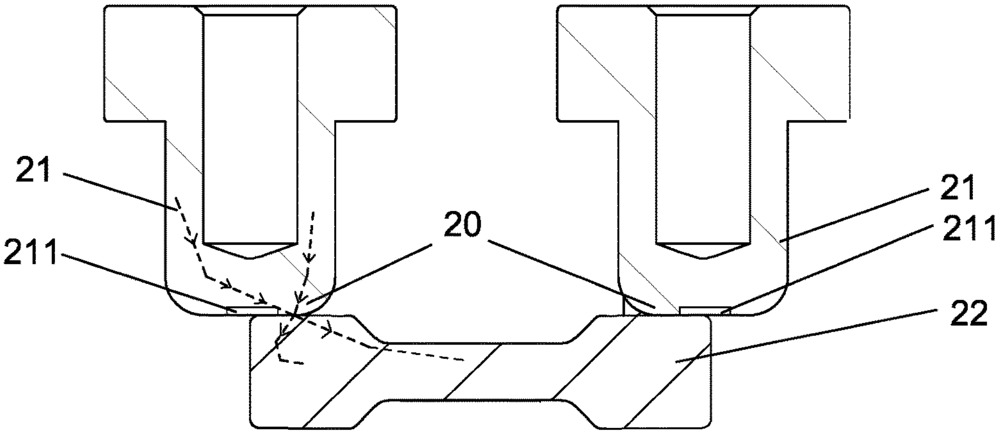
FIG. 14 is a schematic diagram of the current produced when the contact assembly of the relay are contacted according to the second embodiment of the present disclosure.
Figure 15:
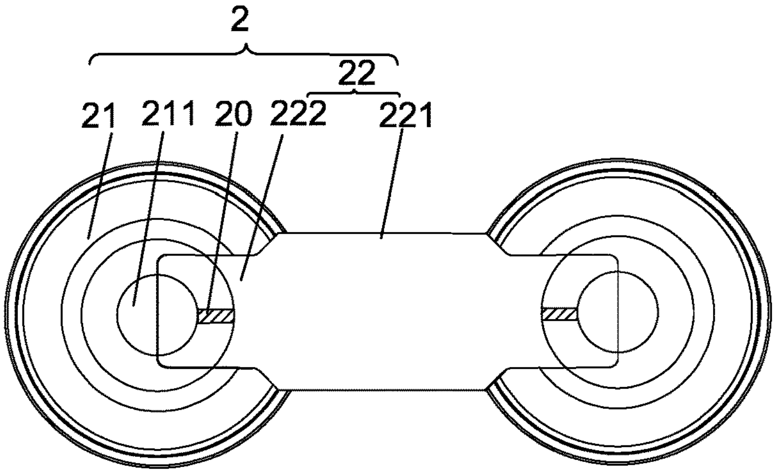
FIG. 15 is a schematic diagram showing the relative positions of the contact assembly and the inner contact portions of the relay provided by the second embodiment of the present disclosure.

As shown in FIG. 13 to FIG. 15, at least one side of the extension portion 222 provided in the embodiment facing the stationary contact lead-out terminal 21 has an arc-shaped structure, and the inner contact portions 20 are located at the sides where the pair of stationary contact lead-out terminals 21 are close to each other.

The extension portion 222 can have a cylindrical structure only on the side facing the stationary contact lead-out terminal 21, for example, the upper side portion of the extension portion 222 is a semi-cylindrical structure, and the lower side portion of the extension portion 222 is a plane. The sides of the extension portion 222 facing and far away from the stationary contact lead-out terminal 21 can be semi-cylindrical structure respectively, so the extension portion 222 can be a rod-shaped structure or a cylindrical structure as a whole, or it can be a rod-shaped structure with a triangular, pentagonal, hexagonal and other polygonal cross sections.

When the movable extension portion 222 has a rod-shaped structure, it can be molded by upsetting or turning using bar or wire. Compared with the traditional movable contact made by stamping the plates, the movable contact piece 22 can be processed without waste or the waste can be greatly reduced, so that the material cost of the movable contact piece 22 can be greatly reduced. By using the circular arc-shaped surface of the round bar, realizing that the two stationary contact lead-out terminals 21 and the movable contact piece 22 are each in an approximate linear small-area contact in the contact state, which reduces the contact resistance between the stationary contact lead-out terminals 21 and the movable contact piece 22 and the electrodynamic repulsion force between the contacts, and improves the contact reliability of the contacts. In addition, due to the circular cross-section of the extension portion 222 of the movable contact piece 22, when the contacts are separated to draw an arc, under the action of the magnetically blown magnetic field, the electric arc can rapidly move outward along the circular arc-shaped surface of the round bar and the circular chamfer of the stationary contact lead-out terminal 21, and as the contact gap rapidly becomes larger, which is conducive to the outward movement of the arc root of the electric arc, thereby reducing the time of continuous ablation of the arc at the contact position, and reducing the wear of the contacts and prolonging the service life of the relay.

Since at least one side of the extension portion 222 facing the stationary contact lead-out terminal 21 is configured to be the arc-shaped structure, and the inner contact portion 20 corresponds to the area of the top position of the extension portion 222, when the shape of the recess 211 is a circular structure, the inner contact portion 20 contracts in the direction close to the center line in the width direction T of the movable contact piece 22 on the basis of the whole convex structure, that is, the inner contact portion 20 narrows in the width direction T of the movable contact piece 22, and further makes the contact area closer to the inside, so as to achieve the purpose of reducing the electrodynamic repulsion force between them.

With this structure, both sides of the inner contact portion 20 along the length direction L of the movable contact piece 22 are respectively flush with the recess wall of the recess 211 and the inner edge of the stationary contact lead-out terminal 21, and the two sides of the inner contact portion 20 in the width direction T of the movable contact piece 22 are arranged in parallel, the contact area is not only relatively small, but also relatively neat, so as to increase the reliability of contact between the stationary contact lead-out terminals 21 and the movable contact piece 22.

In some other embodiments, the overall cross section of the extension portion 222 of the movable contact piece 22 is polygonal, specifically triangular, and one of the vertices of the triangle is upward, which can be cooperated with the bottom end of the stationary contact lead-out terminal 21, so that the stationary contact lead-out terminal 21 and the movable contact piece 22 are still in contact with each other in a small area similar to a linear shape. At the same time, under the action of the magnetically blown magnetic field, the electric arc generated between the stationary contact lead-out terminals 21 and the movable contact piece 22 can quickly move outward along the corresponding inclined plane of the extension portion 222 and the circular chamfer of the stationary contact lead-out terminal 21.

Figure 16:
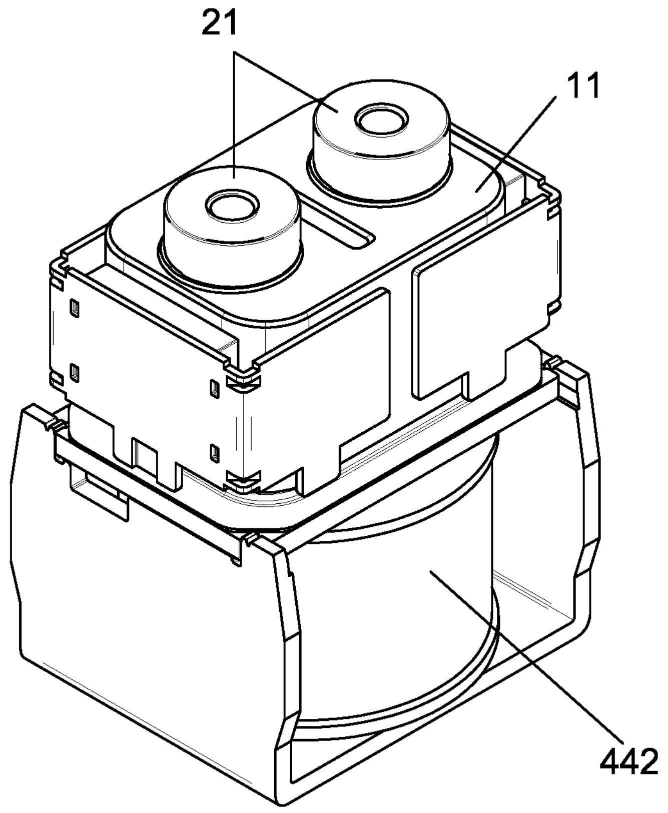
FIG. 16 is a schematic structural diagram of the relay provided by the second embodiment of the present disclosure.
Figure 17:
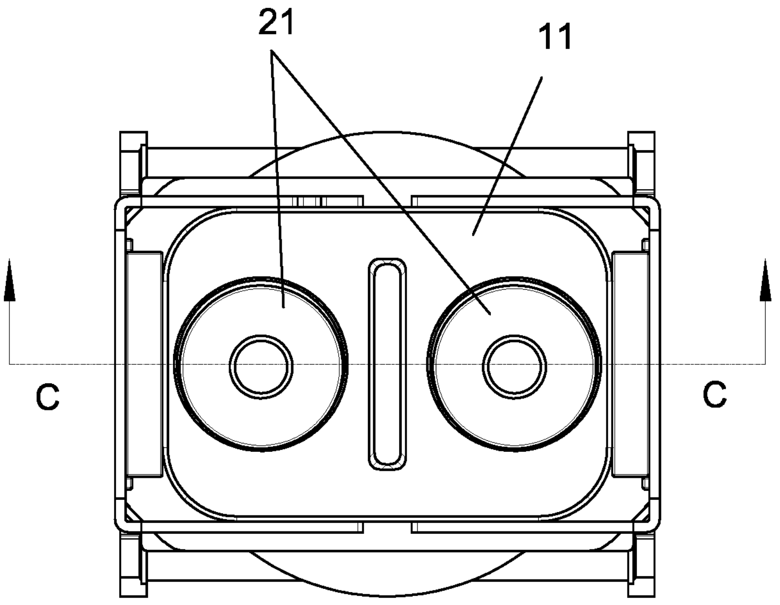
FIG. 17 is a top view of the relay provided by the second embodiment of the present disclosure.

As shown in FIG. 16 to FIG. 18, the relay further includes an electromagnet unit 44, which is disposed at the side of the yoke plate 13 facing away from the insulating cover 11 and surrounds the metal cover. The pushing rod unit 41 is drivingly connected with the electromagnet unit 44. The pushing rod unit 41 is movably arranged in the driving chamber surrounded by the metal cover and the yoke plate 13 and is connected with the movable contact piece 22 through the through hole of the yoke plate 13. When the electromagnet unit 44 is energized, it can drive the pushing rod unit 41 to move, and then drive the movable contact piece 22 to move to contact with or separate from the stationary contact lead-out terminals 21.

The electromagnet unit 44 includes a bobbin 441, a coil 442, a stationary iron core 444 and a movable iron core 443. The bobbin 441 has a hollow cylindrical shape and is formed of an insulating material. The metal cover is configured to be inserted into the bobbin 441, and the coil 442 surrounds the bobbin 441. The stationary iron core 444 is fixedly disposed in the metal cover, and part of the stationary iron core 444 extends into the through hole of the yoke plate 13, as shown in FIG. 18. The stationary core 444 has a first perforation, which is disposed corresponding to the position of the through hole of the yoke plate 13 for the pushing rod unit 41 to pass through. The movable iron core 443 is movably arranged in the metal cover and opposite to the stationary iron core 444, and the movable iron core 443 is connected with the pushing rod unit 41 for being attracted by the stationary iron core 444 when the coil 442 is energized. The movable iron core 443 and the pushing rod unit 41 can be connected by screwing, riveting, welding or other means.

The relay further includes an arc extinguishing unit 5, which is disposed in the hollow chamber of the housing for extinguishing the electric arc of the contact assembly 2. The arc extinguishing unit 5 includes two arc extinguishing magnets 51. The arc extinguishing magnets 51 may be permanent magnets, and each arc extinguishing magnet 51 can be substantially cuboid in shape. The two arc extinguishing magnets 51 are respectively disposed at both sides of the insulating cover 11 and oppositely arranged along the length direction L of the movable contact piece 22.

In the embodiment, the two arc extinguishing magnets 51 are located on the left and right sides of the insulating cover 11. The mutually facing surfaces of the two arc extinguishing magnets 51 have opposite polarities. That is, the left side of the arc extinguishing magnet 51 located on the left side of the insulating cover 11 is S pole and the right side is N pole, and the left side of the arc extinguishing magnet 51 located on the right side of the insulating cover 11 is S pole and the right side is N pole.

Of course, the polarities of the mutually facing surfaces of the two arc extinguishing magnets 51 can also be designed to be the same. For example, the left side of the arc extinguishing magnet 51 located on the left side of the insulating cover 11 is S pole and the right side is N pole, and the left side of the arc extinguishing magnet 51 located on the right side of the insulating cover 11 is N pole and the right side is S pole.

In this way, a magnetic field can be formed around the contact assembly 2 by providing the two arc extinguishing magnets 51 that are opposed to each other.

Therefore, the electric arcs generated between the stationary contact lead-out terminals 21 and the movable contact piece 22 will be elongated in the direction away from each other by the action of the magnetic field, thus realizing arc extinguishing.

The arc extinguishing unit 5 also includes two yoke clamps 52, which are disposed corresponding to the positions of the two arc extinguishing magnets 51. Furthermore, the two yoke clamps 52 surround the insulating cover 11 and the two arc extinguishing magnets 51. By the design that the yoke clamps 52 surround the arc extinguishing magnet 51, the magnetic field generated by the arc extinguishing magnets 51 can be prevented from spreading outward, thereby avoiding the influence on the arc extinguishing effect by the outward spreading of the magnetic field. The yoke clamp 52 is made of soft magnetic material. The soft magnetic materials can include but are not limited to iron, cobalt, nickel and their alloys.

The working process of the relay provided by the embodiment is as follows.

When the coil 442 is energized, the stationary iron core 444 attracts the movable iron core 443, which drives the pushing rod unit 41 to move upward, the spring between the stationary iron core 444 and the movable iron core 443 is compressed, and the pushing rod unit 41 pushes the movable contact piece 22 to move through the U-shaped bracket 42 and the elastic member 43, so that both ends of the movable contact piece 22 contact with the two stationary contact lead-out terminals 21 respectively, thus completing the process of closing the stationary and movable contacts.

When the coil 442 is de-energized, the stationary iron core 444 ends its attraction to the movable iron core 443, and under the elastic force of the compressed spring, the movable iron core 443 drives the pushing rod unit 41 to move downward, so that the movable contacts at both ends of the movable contact piece 22 are separated from the two stationary contact lead-out terminals 21, thus completing the process of separating the movable and stationary contacts.

Third Embodiment

This embodiment is similar to the first embodiment, and the only difference is the specific structure of the movable contact piece 22 and the function of further improving the short circuit resistance.

When the short-circuit load is large, under the action of the short-circuit current, there will be an electrodynamic repulsion force between the movable contact piece 22 and the stationary contact lead-out terminal 21, which will cause the contacts to bounce off, resulting in generating an arc at the contacts and burning violently, and even an explosion may occur.

Figure 19:
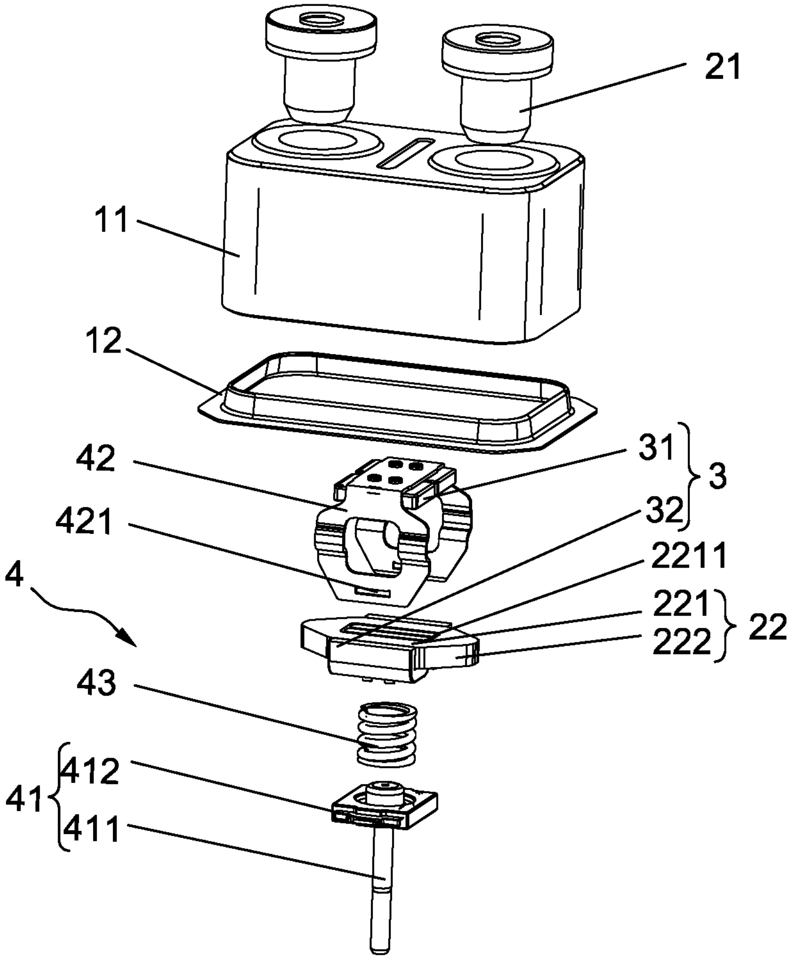
FIG. 19 is an explosion schematic diagram of a contact assembly of the relay provided by the third embodiment of the present disclosure.
Figure 20:
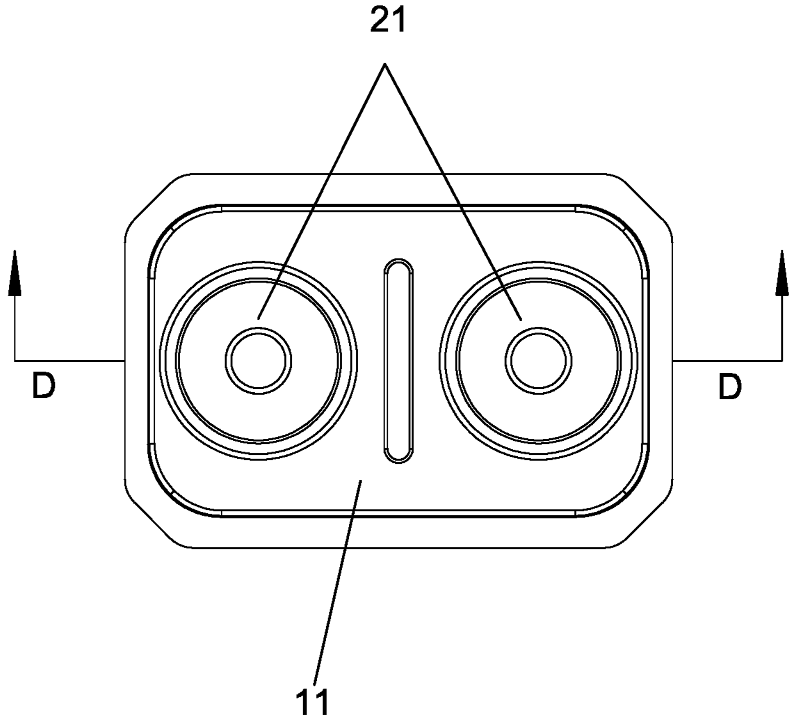
FIG. 20 is a top view of the relay provided by the third embodiment of the present disclosure.
Figure 21:
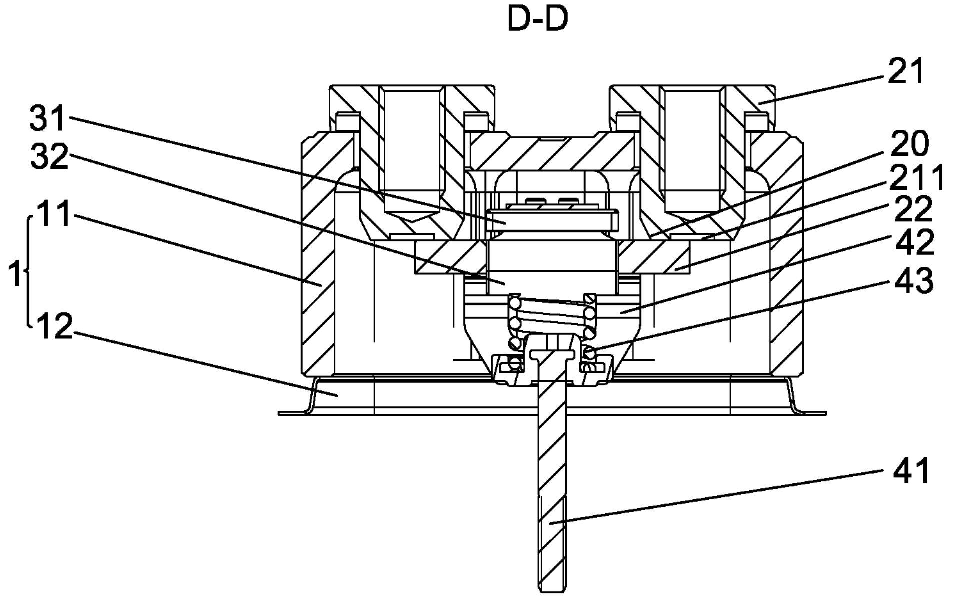
FIG. 21 is a cross-sectional view at D-D in FIG. 20.

Therefore, as shown in FIG. 19 to FIG. 21, the relay provided by the embodiment further includes an anti-short circuit assembly 3 for resisting the electrodynamic repulsion force between the movable contact piece 22 and the stationary contact lead-out terminals 21, and the anti-short circuit assembly 3 is disposed at one side of the thrust portion 221 of the movable contact piece 22 close to the stationary contact lead-out terminal 21, and since the two sides of the thrust portion 221 are planar structures, the bi-lateral planar surfaces of the thrust portion 221 provide the anti-short circuit assembly 3 with mounting convenience and reliability.

In one embodiment, as shown in FIG. 19 to FIG. 21, the anti-short circuit assembly 3 includes an upper magnetizer 31 and a lower magnetizer 32, and the upper magnetizer 31 is disposed at one side of the thrust portion 221 near the stationary contact lead-out terminals 21, and the lower magnetizer 32 is disposed at the side of the thrust portion 221 far away from the stationary contact lead-out terminals 21. The upper magnetizer 31 and the lower magnetizer 32 are capable of forming a magnetic circuit between them to generate a suction force for resisting the electrodynamic repulsion force between the movable contact piece 22 and the stationary contact lead-out terminals 21 in the event of a faulty high current occurred in the movable contact piece 22. Where, the upper magnetizer 31 and the lower magnetizer 32 can be made of materials such as iron, cobalt, nickel and their alloys.

The lower magnetizer 32 is fixed below the thrust portion 221 of the movable contact piece 22, and the lower magnetizer 32 can be moved together with the movable contact piece 22 in a direction close to the stationary contact lead-out terminals 21, so that a magnetic circuit can be formed between the upper magnetizer 31 and the lower magnetizer 32. In the event of a faulty high current occurred in the movable contact piece 22, since the upper magnetizer 31 is located above the movable contact piece 22 and the lower magnetizer 32 is located below the movable contact piece 22, it is equivalent to the movable contact piece 22 being sandwiched between the upper magnetizer 31 and the lower magnetizer 32. When the upper magnetizer 31 generates a suction force to the lower magnetizer 32, the suction force plays the role of attracting and pulling the movable contact piece 22, and is used to resist the electrodynamic repulsion force between the movable contact piece 22 and the stationary contact lead-out terminals 21 due to the fault current, avoiding a situation in which the movable contact piece 22 and the stationary contact lead-out terminals 21 are separated from each other and lead to an arc-drawing explosion, and assuring the reliability and safety of the contact between the movable contact piece 22 and the stationary contact lead-out terminals 21.

In some other embodiments, the upper magnetizer 31 can have a linear structure, and the upper magnetizer 31 is correspondingly disposed between the two movable contacts of the movable contact piece 22, and the upper magnetizer 31 can extend along the width direction T of the movable contact piece 22 for matching and correspondence between the upper magnetizer 31 and the lower magnetizer 32. The lower magnetizer 32 has a U-shaped structure, and the opening of the lower magnetizer 32 faces the movable contact piece 22, so that the two side arms of the lower magnetizer 32 extend in the direction close to the upper magnet 31, so that the two side arms of the lower magnetizer 32 are able to approach or contact with both ends of the upper magnetizer 31 respectively, so as to form a surrounding magnetic conduction ring on the movable contact piece 22 along its width direction T. Since the two ends of the movable contact piece 22 along its length direction L are configured to be the movable contacts, there will be no interference in the surrounding magnetic conduction ring formed along the width direction T of the movable contact piece 22, and when the movable contact piece 22 has a fault high current, electromagnetic attraction in the pressure direction of the movable contacts will be generated to resist the electrodynamic repulsion force between the movable contact piece 22 and the stationary contact lead-out terminals 21 due to the fault current.

In one embodiment, as shown in FIG. 19 to FIG. 21, the thrust portion 221 is provided with a through hole 2211, and the lower magnetizer 32 at least partially penetrates through the through hole 2211.

In this way, the thrust portion 221 of the movable contact piece 22 provides a mounting and fixing position for the lower magnetizer 32, so as to improve the fixing effect between the movable contact piece 22 and the lower magnetizer 32. Since the lower magnetizer 32 is similar to a U-shaped structure, the opening of the lower magnetizer 32 is configured to face the thrust portion 221 of the movable contact piece 22, and one side arm of the lower magnetizer 32 is wrapped around the long side of the movable contact piece 22, and the other side arm penetrates through the through hole 2211.

In one embodiment, as shown in FIG. 19, there are a plurality of upper magnetizers 31 and a plurality of lower magnetizers 32, and the plurality of upper magnetizers 31 and the plurality of lower magnetizers 32 are disposed correspondingly, and the side wall portions of two adjacent lower magnetizers 32 which are close to each other are configured to pass through the through hole 2211.

The plurality of upper magnetizers 31 and the plurality of lower magnetizers 32 are provided in correspondence to increase the magnetic attraction effect between the upper magnetizer 31 and the lower magnetizer 32, and further improve the effect of attracting and pulling the movable contact piece 22 to resist the electrodynamic repulsion force between the movable contact piece 22 and the stationary contact lead-out terminals 21 due to the fault current.

For example, the number of the upper magnetizer 31 and the lower magnetizer 32 are two respectively, and the side walls of the two lower magnetizers 32 which are close to each other are configured to pass through the through hole 2211 together, so that the installation of the two lower magnetizers 32 is realized by using the one through hole 2211, thus reducing the production cost and the assembly difficulty.

In one embodiment, as shown in FIG. 19 to FIG. 21, the U-shaped bracket 42 is fixedly connected to the upper magnetizer 31, and the lower magnetizer 32 is connected to the bottom of the movable contact piece 22, which forms a movable component with the lower magnetizer 32, and the short-circuit assembly 3 and the movable contact piece 22 are disposed between the U-shaped bracket 42 and the pushing rod unit 41. The pushing rod unit 41 and the U-shaped bracket 42 are assembled through the matching of the limit hole 421 and the limit protrusion 412, and the moving force of the pushing rod unit 41 can be transmitted to the U-shaped bracket 42 to drive the movable contact piece 22 to move, so that the movable contact piece 22 can be contacted with or separated from the pair of stationary contact lead-out terminals 21.

Fourth Embodiment

The principle of the embodiment is similar to that of the first embodiment, and the only difference is that the position of the inner contact portion 20 is different.

The inner contact portion 20 provided in the embodiment is configured to be a boss protruding on the side of the movable contact piece 22 close to the stationary contact lead-out terminal 21, and the boss is at least partially located at the side where the pair of stationary contact lead-out terminals 21 are close to each other.

If the side of the movable contact piece 22 near the stationary contact lead-out terminals 21 is configured to be a planar structure, then the contact area between the movable contact piece 22 and the stationary contact lead-out terminals 21 is relatively large. However, in the embodiment, the boss is convexly disposed on the side of the movable contact piece 22 near the stationary contact lead-out terminals 21 to form the inner contact portion 20, thereby reducing the contact region between the movable contact piece 22 and the stationary contact lead-out terminals 21 and further reducing the contact area. The boss is at least partially located at one side where the pair of stationary contact lead-out terminals 21 are close to each other, so that the contact position between the boss and the stationary contact lead-out terminal 21 is as close as possible to the contraction current area in the center of the movable contact piece 22 and concentrated at the inside of the stationary contact lead-out terminal 21, so that the size of the contraction area can be reduced, thereby reducing the electrodynamic repulsion force, and reducing the risk of arcing caused by mutual bounce between the stationary contact lead-out terminals 21 and the movable contact piece 22 to improve the safety.

In one embodiment, the shape of the cross section of the boss is any one of a partial ring and a partial strip.

It can be understood that the ring can include but be not limited to circular ring, elliptical ring, obround ring and polygonal ring, and the polygonal ring can include but be not limited to triangular ring, rectangular ring, pentagonal ring and hexagonal ring.

It can be understood that the shape of the movable contact piece 22 provided in the embodiment can be the shape of the movable contact piece 22 in the first embodiment or the second embodiment, or other shapes.

It can be understood that in some other embodiments, the end of the stationary contact lead-out terminal 21 near the movable contact piece 22 is provided with a recess 211, thereby forming an inner contact portion 20, and a boss is convexly disposed on the side of the movable contact piece 22 near the stationary contact lead-out terminal 21, thereby forming another inner contact portion 20, that is, the stationary contact lead-out terminal 21 and the movable contact piece 22 respectively correspond to two inner contact portions 20, and the sides of the two inner contact portions 20 close to each other are configured to contact with each other, so that the stationary contact lead-out terminal 21 and the movable contact piece 22 contact each other through the two inner contact portions 20.

It should be noted here that the relay shown in the drawings and described in this specification is only one example of applying the principles of the present disclosure. It should be clearly understood by those skilled in the art that the principles of the present disclosure are not limited to any details or any components of the device shown in the drawings or described in the specification.

It should be understood that the present disclosure is not limited to the detailed structure and arrangement of components set forth in this specification. The present disclosure is capable of other embodiments and of being realized and carried out in various ways. The foregoing variations and modifications are within the scope of the present disclosure. It should be understood that the disclosure disclosed and defined in this specification extends to all alternative combinations of two or more individual features mentioned or obvious in the text and/or the drawings. All these different combinations constitute various alternative aspects of the present disclosure. The embodiments described in this specification illustrate the best modes known for carrying out the present disclosure and will enable those skilled in the art to make use of the present disclosure.

Other embodiments of the present disclosure will easily occur to those skilled in the art after considering the specification and practicing the creation disclosed herein. The present disclosure is intended to cover any variations, uses or adaptations of this disclosure, which follow the general principles of the present disclosure and include common sense or common technical means in this technical field that are not disclosed in the present disclosure. The specification and the exemplary embodiments are to be regarded as exemplary only, with the true scope and spirit of the disclosure being indicated by the appended claims.

It should be understood that the present disclosure is not limited to the precise structure described above and shown in the drawings, and various modifications and changes can be made without departing from its scope. The scope of protection of the present disclosure is limited only by the appended claims.

What is claimed is:

1. A relay, comprising:

a contact assembly, comprising a movable contact piece and a pair of stationary contact lead-out terminals, the movable contact piece configured to contact with or separate from the pair of stationary contact lead-out terminals;

wherein at least one of sides of the stationary contact lead-out terminals and the movable contact piece close to each other is provided with an inner contact portion, and the stationary contact lead-out terminals and the movable contact piece are contacted only by the inner contact portion, and the inner contact portion is disposed on a side where the pair of stationary contact lead-out terminals are close to each other, wherein a recess is provided at a bottom of one end of a stationary contact lead-out terminal close to the movable contact piece and the inner contact portion is a portion of the stationary contact lead-out terminal that is not provided with be recess and is located at the side where the pair of stationary contact lead out terminals are close to each other.

2. The relay according to claim 1, wherein the inner contact portion is disposed between center lines of the pair of stationary contact lead-out terminals.

3. The relay according to claim 1, wherein an orthogonal projection area of the inner contact portion on the movable contact piece is smaller than an orthogonal projection area of a bottom portion of a stationary contact lead-out terminal on the movable contact piece.

4. The relay according to claim 1, wherein a shape of a cross section of the recess is any one of circle, and polygon.

5. The relay according to claim 1, wherein a length of the movable contact piece is smaller than a distance between outer edges of corresponding recesses of the pair of stationary contact lead-out terminals.

6. The relay according to claim 1, wherein the inner contact portion is configured to be a boss protruding on one side of the movable contact piece close to the stationary contact lead-out terminals, and the boss is at least partially located at the side where the pair of stationary contact lead-out terminals are close to each other.

7. The relay according to claim 1, wherein an orthographic projection area of an end surface of a bottom portion of a stationary contact lead-out terminal facing the movable contact piece on the movable contact piece is less than or equal to an orthographic projection area of a middle portion of the stationary contact lead-out terminal on the movable contact piece.

8. The relay according to claim 1, the movable contact piece comprising:

a thrust portion, disposed between projections of the pair of stationary contact lead-out terminals on the movable contact piece;

two extension portions, disposed at both sides of the thrust portion and configured to contact with the pair of stationary contact lead-out terminals correspondingly;

wherein a projected area of the inner contact portion relative to a reference plane is smaller than a projected area of an extension portion relative to the reference plane, and the reference plane is a plane where an upper surface of the thrust portion is located.

9. The relay according to claim 8, wherein the extension portion is configured to be a tapered structure, and a small end of the extension portion is disposed away from the thrust portion, so that the inner contact portion approaches to the side where the pair of stationary contact lead-out terminals are close to each other.

10. The relay according to claim 8, wherein at least one side of the extension portion facing the stationary contact lead-out terminals is configured to be an arc-shaped structure, and the inner contact portion is located at the side where the pair of stationary contact lead-out terminals are close to each other.

11. The relay according to claim 10, wherein in a width direction of the movable contact piece, two sides of the inner contact portion are arranged in parallel.

12. The relay according to claim 8, wherein in an axial direction of a stationary contact lead-out terminal, both sides of the thrust portion are configured to be a planar structure respectively.

13. The relay according to claim 9, further comprising an anti-short circuit assembly, which is at least disposed at one side of the thrust portion close to the stationary contact lead-out terminals.

14. The relay according to claim 13, the anti-short circuit assembly comprising:

an upper magnetizer, disposed at one side of the thrust portion near the stationary contact lead-out terminals;

a lower magnetizer, disposed at one side of the thrust portion far away from the stationary contact lead-out terminals; wherein the upper magnetizer and the lower magnetizer are capable of forming a magnetic circuit therebetween to generate a suction force for resisting an electrodynamic repulsion force between the movable contact piece and the stationary contact lead-out terminals in case that a faulty high current is occurred in the movable contact piece.

15. The relay according to claim 14, wherein the thrust portion is provided with a through hole, and the lower magnetizer is configured to at least partially penetrate through the through hole.

16. The relay according to claim 15, wherein there are a plurality of upper magnetizers and a plurality of lower magnetizers, and the plurality of upper magnetizers and the plurality of lower magnetizers are disposed correspondingly, and side wall portions of two adjacent lower magnetizers which are close to each other are configured to pass through the through hole.

17. The relay according to claim 2, wherein an orthographic projection area of a bottom portion of a stationary contact lead-out terminal on the movable contact piece is less than or equal to an orthographic projection area of a middle portion of the stationary contact lead-out terminal on the movable contact piece.

18. The relay according to claim 2, the movable contact piece comprising:

a thrust portion, disposed between projections of the pair of stationary contact lead-out terminals on the movable contact piece;

two extension portions, disposed at both sides of the thrust portion and configured to contact with the pair of stationary contact lead-out terminals correspondingly;

wherein a projected area of an inner contact portion relative to a reference plane is smaller than a projected area of an extension portion relative to the reference plane, and the reference plane is a plane where an upper surface of the thrust portion is located.

* * * * *